April 21, 1970 A. S. MILLER ET AL 3,508,015
ELECTROLUMINESCENT DIODE AND SOUND RECORDING SYSTEM
Filed June 9, 1966
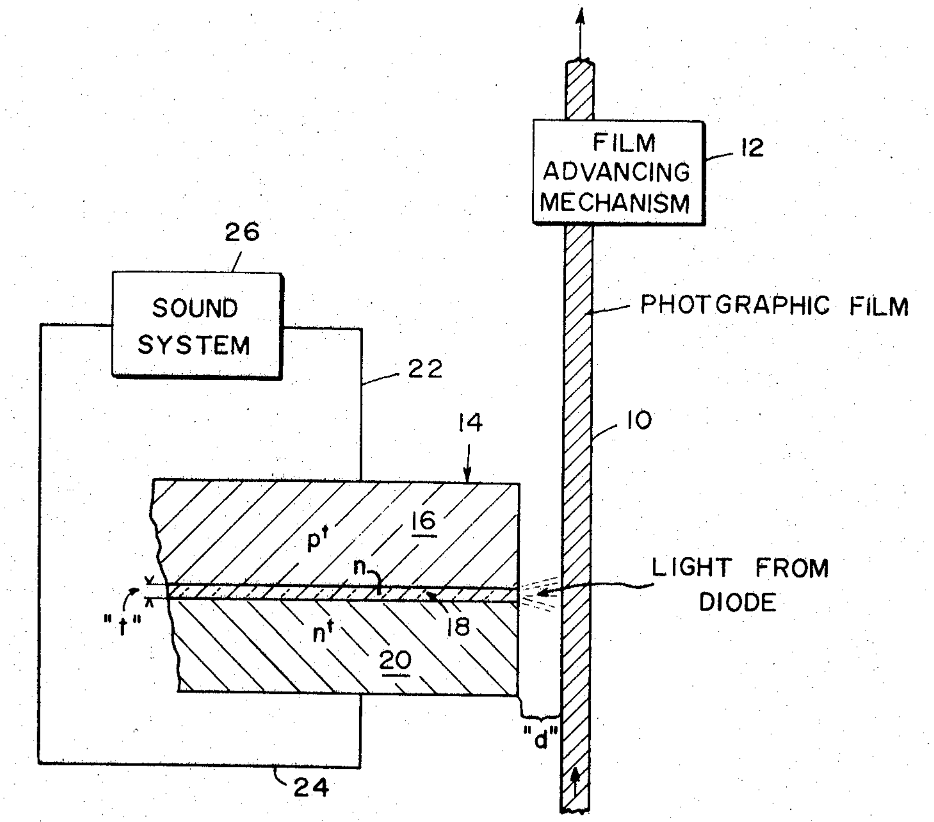
"t" LESS THAN .001 INCH
"d" LESS THAN .002 INCH
$p^t$ IS OPAQUE
n IS TRASPARENT
$n^t$ IS OPAQUE United States Patent Office
3,508,015
Patented Apr. 21, 1970

3,508,015
ELECTROLUMINESCENT DIODE AND SOUND RECORDING SYSTEM

Allan S. Miller, Wellesley, and Paul L. Vitkus, Bedford, Mass., assignors to National Research Corporation, Newton Highlands, Mass., a corporation of Massachusetts Continuation-in-part of application Ser. No. 532,121, Mar. 7, 1966. This application June 9, 1966, Ser. No. 556,408
Int. Cl. G11b *7/00;* G01d *9/42*
U.S. Cl. 179—100.3 3 Claims

ABSTRACT OF THE DISCLOSURE

A sound recording system is provided wherein a light-emitting diode is positioned close to the edge of a photosensitive film. The diode has a junction formed between a first opaque layer of either p or n conductivity material and a transparent layer of the opposite conductivity material. The thickness of the transparent layer measured in the direction of relative movement between the film and the light-emitting diode is less than .001 inch.

The present invention relates to improved electroluminescent junction diodes and sound recording systems for using such diodes. This application is in part a continuation of copending application Ser. No. 532,121, filed Mar. 7, 1966, now abandoned.

Prior art

For many years, the art has searched for better methods of recording sound on photographic film, particularly for the production of sound motion pictures. Present commercial systems involve either the use of magnetic tape or complex electro-mechanical-optical systems.

It is a principal object of the present invention to provide an improved sound recording system which obviates the difficulties of the prior art.

Another object of the invention is to provide an improved electroluminescent silicon carbide junction diode particularly suitable for such sound recording system.

Summary of the invention

The invention is particularly concerned with the production of a sound recording system containing a narrow, efficient electroluminescent junction diode as a source of light for producing a latent image on a photographic film. The diode is preferably positioned within .002 inch of the surface of the photographic film so that light coming out of one edge of the junction impinges directly on the film. The diode preferably has a heavily doped base crystal which is substantially opaque, a thin transparent epitaxial layer on the base crystal forming a p-n junction therewith, and an overlying heavily doped region in the epitaxial layer which is also substantially opaque to emitted light. In a preferred embodiment of the invention, the diode comprises a silicon carbide crystal containing a high concentration of aluminum in excess of 1000 p.p.m. and a thin transparent epitaxial "*n*" layer grown on the aluminum-doped base crystal. The crystal also preferably has a very abrupt junction as indicated by a capacitance in excess of $1\times10^4$ pf./cm.$^2$ at 0 volts. The diode should also have an external quantum efficiency in excess of $1\times10^{-5}$. For recording purposes, the light emitted from the diode is preferably in the blue end of the spectrum to which most photographic film is sensitive.

In order that the invention may be more fully understood, reference should be had to the highly diagrammatic, schematic representation shown in the accompanying drawing. In this drawing, the photographic film is indicated at 10, this film being suitably advanced, preferably at constant speed, by a film advancing mechanism schematically indicated at 12. Closely adjacent to the film is positioned a junction diode shown generally at 14, this diode preferably comprising a heavily doped "$p^+$" section 16, a transparent "*n*" layer 18 and a heavily doped "$n^+$" section 20. The edge of the junction is spaced by a distance "*d*" (preferably less than .002 inch) from the surface of the film. As indicated on the drawing, the width of the transparent "*n*" section of the diode (shown as "*t*") is preferably less than .001 inch. A pair of leads 22 and 24 are schematically indicated as connecting the diode to a sound system 26 wherein sound is converted to a varying electrical current which is passed through the diode to create a varying light which issues from the edge of the transparent "*n*" region facing the film.

In one preferred embodiment of the invention, a silicon carbide junction diode was prepared for use in recording sound on motion picture film as set forth in the following nonlimiting example:

EXAMPLE

A small graphite crucible was constructed from high purity graphite (less than 5 p.p.m. ash) obtained from the Ultra Carbon Corporation. The crucible was ⅝" deep on the inside and was 1⅛" tall on the outside. A small cover ⅛" thick was constructed of the same material. It was supported inside of a quartz tube 15" long and 1¼" in diameter by a carbon rod 8" long. On the outside of the tube was positioned an induction coil energized by a 10 kw. radio frequency generator.

The crucible was then outgassed at 2000° C. for ¼ hour in helium and prepared by placing 1 gram of pure (99.999%) silicon inside the crucible. The crucible was then covered, placed inside the quartz tube and heated to 1950° C. for one hour while helium flowed downward and over the crucible. The crucible thus prepared was found to be lined with tiny silicon carbide crystals.

Approximately 2.5 grams of high purity n-type silicon carbide were now placed in the crucible in the form of small crystals crushed to approximately 1⁄16" to 1⁄16". A large, high-purity, n-type silicon carbide crystal was placed on top of the smaller crystals. A p-type crystal containing about 10,000 p.p.m. aluminum and having dark blue color was placed on top of the n-type crystal, this top crystal had a resistivity of .06 ohm cm. and a low Hall coefficient. Next the crucible with its cover was heated to 1950° C. in the quartz tube for one hour while helium was flowing through the tube. After 60 minutes, the crucible was cooled and the top large silicon carbide crystal removed. A layer of n-type silicon carbide had grown on the lower surface of the top crystal to provide a thin (less than .001 inch) transparent layer. Below this layer was an optically opaque region which seemed to contain many crystal imperfections and much impurity. The crystal was then processed in the following manner:

(1) The top surface of the large crystal was ground to remove the diffused layer.

(2) This crystal was then contacted on both sides with a pure silver contact using $TiH_2$ as a flux in a helium atmosphere at 1000° C.

(3) The crystal was then trimmed to a small cube and one edge of the diode perpendicular to the junction was polished to provide an optically smooth light-emitting surface.

The electrical characteristics of the resulting diode were then taken and current vs. voltage data are shown in the following Table I.

TABLE I.—CURRENT-VOLTAGE CHARACTERISTICS

| Amps | Volts Forward | Volts Reverse |
|---|---|---|
| $1\times10^{-8}$ | 0.33 | 1.60 |
| 2 | 0.37 | 2.25 |
| 5 | 0.46 | 3.20 |
| $1\times10^{-7}$ | 0.52 | 3.80 |
| 2 | 0.59 | 4.30 |
| 5 | 0.70 | 5.00 |
| $1\times10^{-6}$ | 0.79 | 5.50 |
| 2 | 0.88 | 6.10 |
| 5 | 1.05 | 7.10 |
| $1\times10^{-5}$ | 1.17 | 7.90 |
| 2 | 1.30 | ---------- |
| 5 | 1.57 | ---------- |
| $1\times10^{-4}$ | 1.82 | ---------- |
| 2 | 2.08 | ---------- |
| 5 | 2.30 | ---------- |
| $1\times10^{-3}$ | 2.40 | ---------- |
| 2 | 2.50 | ---------- |
| 5 | 2.57 | ---------- |
| $1\times10^{-2}$ | 2.60 | ---------- |
| 2 | 2.65 | ---------- |
| 3 | 2.68 | ---------- |

The external quantum efficiency of the crystal produced in the example was $2\times10^{-5}$ and its light output was blue. Since the heavily doped starting p-type crystal was very dark and opaque, the generated light was sharply defined and was emitted from the very narrow region of the p-n junction. This narrow light emitting junction was less than .0005" wide and was found to be suitable for recording a sound track on color motion picture film as well as black and white film.

The specific diode prepared in the example had a relatively abrupt junction as indicated by a capacitance of $9\times10^4$ pf./cm.$^2$ at 0 volts.

The diode was positioned so that the polished edge was within .001 inch of a standard "Plus X" black and white photographic film purchased from Eastman Kodak Company and used to record a high fidelity musical signal. The film was developed by standard methods and used in a standard sound projector. An excellent audio signal was obtained, the signal being essentially indistinguishable from the original sound.

While one preferred embodiment of the invention has been described above, numerous modifications thereof may be practiced without departing from the spirit of the invention. For example, a narrow, greenish-yellow, light source may be provided from a gallium phosphide junction diode. In this case, an epitaxial layer of gallium phosphide is grown on, for example, a heavily doped p-type gallium phosphide crystal containing zinc as a dopant. The epitaxial layer should be lightly doped with tellurium to give a transparent *n* layer and the outer section of the epitaxial layer should be heavily doped with tellurium to give an $n^+$ layer. As mentioned, the junction face adjacent to the film should be polished and the width of the transparent section should be less than .001 inch in thickness. The junction edge should be positioned less than .002 inch from the surface of the photographic film.

While the invention has been primarily described in connection with its use for sound recording, it equally can be employed for recording other data, and the diode may be employed for uses other than recording sound, such as fast response light source for use in computers, signaling and display systems.

Since certain changes can be made in the above product without departing from the scope of the invention herein involved, it is intended that all matter contained in the above description shall be interpreted as illustrative and not in a limiting sense.

What is claimed is:

1. A sound recording system comprising means to create relative movement between a photographic film to be exposed and a modulated light source to create a sound track upon said relatively moving photographic film, characterized in that the light source comprises a light emitting junction diode having an edge of the junction positioned less than .001 inch from the film to expose the film by direct impingement of the emitted light thereon, the narrower dimension of the diode edge aligned with the direction of relative movement, the junction being formed between a first opaque layer of P or N conductivity material and a transparent layer of the opposite conductivity material, the thickness of the transparent layer as measured in the direction of relative movement being less than .001 inch, the opposite side of the transparent layer joined to another opaque layer, a sound means for responding to varying sound energy, to impose a varying electrical current which is passed through the diode to create a varying light which issues from said edge.

2. The system of claim 1 wherein the first opaque layer comprises silicon carbide which is doped with aluminum in excess of 1000 p.p.m.

3. The system of claim 1 wherein the edge of the diode is positioned less than .001 inch from the film.

References Cited

UNITED STATES PATENTS

| | | | |
|---|---|---|---|
| 1,835,226 | 12/1931 | Kuchenmeister | 179—100.3 |
| 3,074,887 | 1/1963 | Carroll. | |
| 3,129,125 | 4/1964 | Hamilton. | |
| 3,254,280 | 5/1966 | Wallace | 317—237 |
| 3,341,857 | 9/1967 | Kabell | 346—107 |
| 3,377,210 | 4/1968 | Somerville et al. | |
| 2,776,367 | 1/1957 | Lehovec. | |
| 3,308,452 | 3/1967 | Michel | 340—324 |
| 3,333,135 | 7/1967 | Galginitis | 313—108 |
| 3,361,678 | 1/1968 | Addamiano | 252—301.4 |
| 3,419,742 | 12/1968 | Herzog | 313—108 |
| 3,354,342 | 11/1967 | Ohntnup et al. | 313—108 |

FOREIGN PATENTS

| | | |
|---|---|---|
| 263,181 | 9/1967 | Great Britain. |
| 242,819 | 1/1961 | Australia. |

OTHER REFERENCES

Fischer: Injunction Electroluminescence, Solid-State Electronics, Pergamon Press 1961, vol. 2, pp. 232—246.

Kabell et al.: chpt. 37, Optical & Electro-Optical Information Processing, 1965, pp. 707–714.

Kholuyanov: The Roles of Boron, Nitrogen & Gallium in the Electroluminescence of S.C. P-N Junctions, Sov. Phys.-Solid State, vol. 7, No. 11, May 1966 (original pub. November 1965.

JAMES W. MOFFITT, Primary Examiner

R. F. CARDILLO, Jr., Assistant Examiner

U.S. Cl. X.R.

313—108; 317—235; 346—107